United States Patent [19]

Hamlin et al.

[11] Patent Number: 5,004,485
[45] Date of Patent: Apr. 2, 1991

[54] MOLECULAR SIEVE-TYPE GAS SEPARATION SYSTEMS

[75] Inventors: Humphrey A. S. Hamlin, Montacute; Michael W. Harral, Yeovil, both of England

[73] Assignee: Normalair-Garrett (Holdings) Ltd., Yeovil, England

[21] Appl. No.: 498,393

[22] Filed: Mar. 26, 1990

[30] Foreign Application Priority Data

Apr. 3, 1989 [GB] United Kingdom ............... 8907447

[51] Int. Cl.$^5$ ............................................. B01D 53/04
[52] U.S. Cl. ...................................... 55/160; 55/179; 55/271; 55/389
[58] Field of Search ............... 55/18, 20, 21, 25, 26, 55/68, 160–163, 179, 180, 387, 389, 271

[56] References Cited

U.S. PATENT DOCUMENTS

| | | |
|---|---|---|
| 4,197,095 | 4/1980 | White, Jr. et al. ............... 55/179 X |
| 4,404,005 | 9/1983 | Hamlin et al. ............... 55/163 |
| 4,428,372 | 1/1984 | Beysel et al. ............... 55/179 X |
| 4,537,607 | 8/1985 | Rogers et al. ............... 55/179 X |
| 4,594,080 | 6/1986 | Tremain et al. ............... 55/179 |
| 4,661,124 | 4/1987 | Hamlin et al. ............... 55/163 X |
| 4,681,602 | 7/1987 | Glenn et al. ............... 55/179 X |
| 4,687,013 | 8/1987 | Stevenson ............... 55/163 X |
| 4,737,170 | 4/1988 | Searle ............... 55/179 |
| 4,783,205 | 11/1988 | Searle ............... 55/179 X |
| 4,927,434 | 5/1990 | Cordes et al. ............... 55/179 X |

FOREIGN PATENT DOCUMENTS

| | | | |
|---|---|---|---|
| 0124981 | 11/1984 | European Pat. Off. ............ 55/162 |
| 0129304 | 12/1984 | European Pat. Off. ............ 55/389 |
| 0196157 | 10/1986 | European Pat. Off. ............ 55/389 |
| 0225736 | 6/1987 | European Pat. Off. ............ 55/389 |
| 0262934 | 4/1988 | European Pat. Off. ............ 55/161 |
| 2029257 | 3/1980 | United Kingdom ............ 55/21 |
| 2066693 | 7/1981 | United Kingdom ............ 55/163 |
| 2154464 | 9/1985 | United Kingdom ............ 55/389 |

Primary Examiner—Robert Spitzer
Attorney, Agent, or Firm—Larson & Taylor

[57] ABSTRACT

An aircraft on-board oxygen generation system having a controller 14 for cycling sieve beds of amolecular sieve-type gas separation system 10, provides product gas having a partial pressure of oxygen that more closely approaches the ideal value at any cabin altitude within the operating range of the aircraft. The controller stores a look-up table of desired product gas oxygen content at various altitude levels within the operating range and displays desired product gas oxygen content at altitudes sensed by an altitude sensor 17 for comparison with delivered product gas oxygen content sensed by oxygen content sensor 19. The controller provides for a range of selectable cycle time and adjusts the cycle time in the sense required to null the difference between displayed and sensed oxygen content of the product gas.

12 Claims, 3 Drawing Sheets

MOLECULAR SIEVE-TYPE GAS SEPARATION SYSTEMS

BACKGROUND OF THE INVENTION

1. Field of the Invention

This invention relates to gas separation systems using molecular sieves and is especially concerned with the employment of such systems in the aviation field for obtaining oxygen-enriched air as a breathable gas for aircrew.

2. Description of the Prior Art

A common manner of operating a molecular sieve-type gas separation system employing one or more molecular sieve beds, involves charging the or each bed with feed gas mixture—e.g. air—under pressure and continuing the feed to the bed to maintain the charge pressure during delivery of the required product gas constituent(s) to use or to storage. When the bed approaches saturation with adsorbed constituents of the feed gas, the bed is regenerated: for this purpose the feed is discontinued and the bed vented to release the charge pressure, whereafter the bed is purged. The pressurising of the sieve bed promotes adsorption of the constituents to be retained by the bed, while the subsequent depressurising promotes desorption of the retained constituents to facilitate flushing of these from the bed.

In aircraft applications it is normally required that the oxygen concentration in the breathable gas supplied to aircrew shall be so related to cabin altitude, i.e. to the ambient pressure obtaining within the aircrew enclosure, that the oxygen partial pressure in the breathable gas is kept within a physiologically acceptable range of values. In this regard, the normally accepted minimum oxygen content of the breathable gas is that required to provide, at all cabin altitudes, the same oxygen partial pressure as at sea level. However in the case of military aircraft intended to operate at very high altitudes, this minimum oxygen content is inappropriate for certain flight regimes. Thus at high altitude provision must be made for the possibilities of rapid cabin depressurisation arising, for instance, from structural damage. In such an event there is a rapid decompression of the breathable gas within the lungs of an aircrew member and it is generally accepted that if loss of consciousness in these circumstances is to be avoided, the oxygen content of the gas in the lungs at the onset of cabin depressurisation needs to be such that it provides a minimum partial pressure of 30 mm Hg at the termination of decompression: that is, when the total gas pressure in the lungs corresponds to atmospheric pressure at the operating altitude. Consciousness can then be maintained if the breathable gas available thereafter has an oxygen content of 100%. For these reasons, at high altitudes the breathable gas supplied to the crew of military aircraft should have an oxygen content giving a partial pressure greater than the sea level equivalent.

On the other hand, under high acceleration forces, parts of the lungs can distort to entrap pockets of gas. If the entrapped gas has a composition such that it can be wholly adsorbed while the entrapment persists, the regions in which it is entrapped can collapse, causing pain and discomfort. This risk of total adsorption of entrapped gas increases with increasing oxygen content—i.e. decreasing inert gas (nitrogen) content—so that it is undesirable, especially in a highly manoeuvrable aircraft that may be subject to high G-forces, to supply a breathable gas of excessive oxygen content. In general the highest acceleration forces mainly occur in manoeuvres at low altitude where the need, for other reasons, for a high oxygen content in the breathable gas does not exist. Accordingly while there are reasons for providing a higher than physiologically necessary oxygen content in the breathable gas at high altitude, there are distinct disadvantages in supplying a breathable gas with a higher than necessary oxygen content at lower altitudes.

These considerations in effect establish at every operating altitude an individual range of oxygen content for the breathable gas to be supplied to the aircrew of a modern high performance military aircraft.

Aircraft on-board oxygen generation systems (OBOGS) based on molecular sieve gas separation technology and operating in the manner outlined above can be made to deliver a product gas with an oxygen content that increases with altitude, by the simple expedient of venting the or each sieve bed, during its regeneration phase, to the external atmosphere (or to the cabin, which has a pressure related to that of the external atmosphere) so that with increasing altitude the bed pressure during desorption reduces, thereby progressively to enhance desorption of retained constituents with increasing altitude. See, for instance, EP-A-0 080 300. However, the "self-regulation" possible by this expedient is limited and to provide better regulation and a closer approach to ideal product gas constitution over an extended altitude range, supplementary control expedients are needed. In the system EP-A-0 080 300 for instance, there is a fixed logic sequencer controlling the sequential operation of charge and vent valves for cyclically subjecting each sieve bed to a charge/adsorption on-stream phase followed by purge/desorption regeneration phase. The control means provide that for a predetermined range of ambient atmospheric pressure (altitude range) the overall cycle time and the relative durations of the phases are fixed at values such that the oxygen content of the delivered product gas remains within physiologically acceptable limits for breathing. The cycle time is modified at one or more predetermined altitude thresholds to provide a suitably extended operating altitude range within which the product gas constitution is acceptable. However because the control means take no account of demand flow rate (which affects the performance of the molecular sieve system) there is a tendency for this OBOGS to deliver over-high oxygen concentration under certain demand flow conditions within certain altitude ranges. This is not only undesirable for the reasons already discussed, but also because the production of excessively oxygen-rich breathable gas represents an excessive use of feed air, usually engine bleed air, for which there are usually competing demands.

EP-A-0 129 304 discloses a molecular sieve-type gas separation system that aims to maintain the simplicity of control provided by the system of EP-A-0 080 300 while providing enhanced control of the product gas constitution under an extended range of demand flow rates. To this end, the system of EP-A-0 129 304 is characterised by means responsive to the pertaining concentration of a desired constituent (e.g. oxygen) in the product gas and arranged to adjust the overall cycle time in such manner that this concentration is maintained within predetermined limits. The control means of the system in EP-A-0 129 304 may comprise a fixed logic sequencer controlling the sequential operation of charge and vent valves as in the system of EP-A-0 080 300. However instead of adjusting this sequencer to vary the cycle time merely by reference to altitude, in the system of EP-A-0 129 304 adjustment of the fixed logic sequencer to vary the cycle time is accomplished by means responsive to the product gas composition, e.g. a transducer sensitive to the oxygen partial pressure of the product gas, thereby to take account both of altitude and demand flow rate and, indeed, other operating parameters that affect the product gas composition.

EP-A-0 129 304 discloses the possibilities of using, as a partial pressure transducer, a galvanic type gas sensor or a flueric partial pressure sensor or a flueric partial pressure sensor (such as disclosed in EP-A-0 036 285). In the system particularly described, the fixed logic sequencer unit provides two different overall cycle time modes and is switched between these in response to signals output by the partial pressure transducer. However it is disclosed that the switch that accomplishes this changeover may be substituted by a variable resistor means to provide a varying voltage output signal for a suitably responsive timer to vary the cycle time steplessly or in a number of steps between predetermined minimum and maximum cycle times, in a manner appropriate to retaining the desired partial pressure of oxygen in the product gas by producing a cycle time adjustment that takes account of the magnitude of sample gas oxygen partial pressure departure from the required value.

The system of EP-A-0 129 304, like the system of EP-A-0 080 300, aims to provide a breathable gas product exhibiting a rising oxygen concentration with cabin altitude increase such as to provide a substantially constant oxygen partial pressure at all cabin altitudes within the operating range, this partial pressure being chosen so as to fall within the permissible range of values for all cabin altitudes. The chosen value is necessarily a compromise and in practice falls close to one or the other limiting values of the permissible range at certain cabin altitudes and, especially, is higher than desirable at low altitudes.

SUMMARY OF THE INVENTION

An objective of the present invention is to provide a molecular sieve type gas separation system for the on-board production of breathable gas for aircrew that is better adapted to the requirements of modern high performance military aircraft, by providing for the production of a gas having a partial pressure of oxygen that more closely approaches the ideal value at any cabin altitude within the operating range.

In meeting this objective the invention provides an on-board oxygen generating system for an aircraft, comprising a molecular sieve-type gas separation system arranged to deliver oxygen-enriched air as product gas to an outlet by adsorbing nitrogen from air fed to the system, the system including at least two sieve beds and control means for cyclically subjecting each said sieve bed to a charge/adsorption on-stream phase followed by a purge/desorption regeneration phase, the control means providing for a range of selectable cycle times and including means sensitive to the oxygen content of the product gas, means responsive to the aircraft altitude to display a desired oxygen content of said product gas at an altitude within an operating range, and comparator means for comparing the displayed desired oxygen content with the sensed oxygen content of the product gas and adapted to adjust the cycle time in the sense required to null the difference between said displayed and sensed oxygen contents of the product gas.

In preferred embodiments of the invention the control means is so arranged that during regeneration each bed is opened to ambient atmospheric pressure or to a pressure related thereto, so as to achieve the self-regulating effect discussed above, whereby the range of cycle time adjustment required to achieve matching of desired and sensed product gas oxygen contents within a large envelope of operating conditions is conveniently restricted.

It should be understood that oxygen content values may be presented as concentration values or partial pressure values as convenient, having regard to the physical organisation of the control means. Because altitude information is available to the control means, total pressure information is thus available for conversion of partial pressure values to concentration values and conversely to enable convenient comparison of the displayed and sensed values, however these may be individually presented.

Accordingly, the means sensitive to the oxygen content of the product gas, oxygen-enriched air, may take various forms and may, for instance, take the form of a partial pressure sensor of suitable type. However in preferred embodiments, the means sensitive to product gas oxygen content comprise an oxygen concentration sensor of the type that provides an output directly indicative of oxygen concentration, such as a zirconia cell-type of oxygen concentration sensor. Such a device has a very rapid response to changes in oxygen concentration and can therefore enable the system to respond rapidly to changing flight conditions, demand flow rates and so on.

The control means may be variously organised. In preferred embodiments a solid state device such as a microprocessor with associated memory is programmed to control the sequential operation of charge and vent valves with a series of selectable overall cycle times ranging between a minimum and a maximum in a number of discrete steps. The associated memory stores a look-up table of desired product gas oxygen contents at various altitude levels within an operating range. The device is associated with means providing altitude signals to enable the desired product gas oxygen content appropriate to the operating altitude to be displayed by reference to the look-up table. The same device may also provide the comparator function or this may be provided by a discrete device. Where, as is preferred, a zirconia cell oxygen concentration sensor is the means sensitive to product gas oxygen content, the relevant function control unit for this may be discrete or incorporated in the device providing the control means. Some or all of the functions of the control means may be provided by an aircraft on-board computer providing other functions in the operation of the aircraft and its equipment.

The control means or associated devices may provide various ancillary functions such as test facilities, means for discriminating between ground and flight conditions, and warnings of malfunction and/or overload. For instance the control means may be arranged to display maximum and/or minimum permissible product gas oxygen contents in addition to desired product gas oxygen content at any sensed altitude level, the comparator means or an ancillary comparator being adapted to output a warning signal in the event that the sensed product gas oxygen content is beyond a displayed permissible limit value. For such purposes the control means or associated auxiliary devices may receive signals indicative of inlet air pressure at the separation system, and of demand flow rate, to enable warning arrangements triggered by sensed product gas oxygen content to discriminate between failure and overload conditions, and signal appropriately.

The control means may also be adapted to receive or derive rate information in relation to altitude or other operating parameters and on the basis thereof to superimpose an adjustment on the cycle time to anticipate the magnitude of a required change in desired product gas oxygen content.

Further, the control means may be adapted for switching between selectable operating modes appropriate to the mission being or to be flown by an aircraft to which the system is fitted, and/or provide for ready adaptation of the system to the requirements of the aircraft to which it is fitted.

Thus for instance, the control means may be arranged for selection of the oxygen content of the breathable gas to be delivered by the system at the commencement of a mission to enable requirements of a particular mission profile to be anticipated. For example, a low-level attack mission requires, as noted, delivery of breathable gas of oxygen content near to the required minimum to safeguard against the effects excessive oxygen concentration during low altitude high-G manoeuvres. On the other hand, a mission at high altitude reached by rapid climb after take-off would be better served by delivery of breathable gas with the maximum permissible oxygen content.

BRIEF DESCRIPTION OF THE DRAWINGS

A typical embodiment of the invention is described by way of example and with reference to the accompanying drawings in which.

DETAILED DESCRIPTION OF THE DRAWINGS

Figure 1:
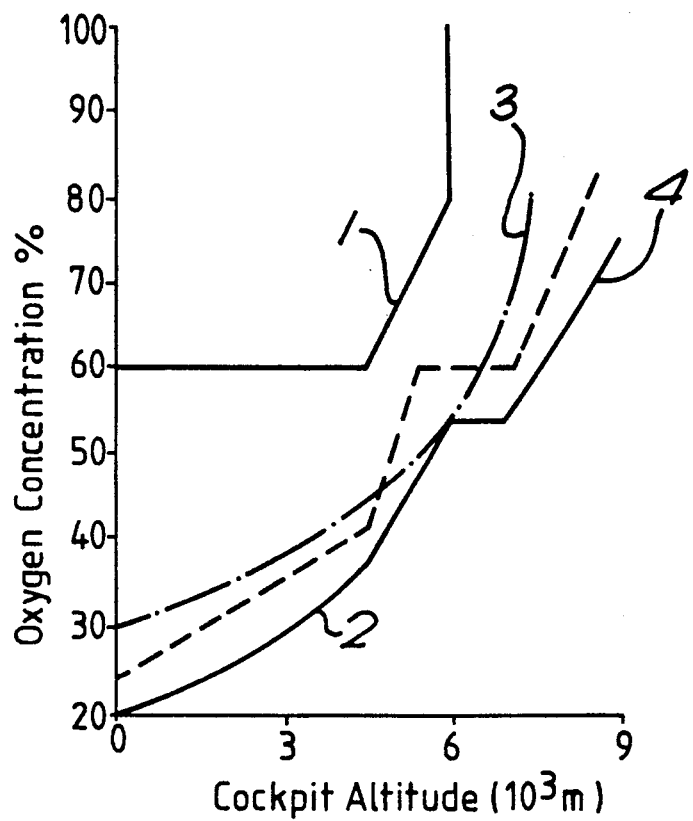
FIG. 1 is a graph illustrating relationships between cabin pressure and aircrew breathable gas oxygen content requirements and provisions for a typical high performance military aircraft.

FIG. 1 of the drawings is a graphical representation of the relationships between cabin pressure and aircrew breathable gas oxygen content requirements and provisions for a modern high performance military aircraft. Oxygen content is expressed as volume percentage oxygen concentration and cabin pressure is expressed in terms of altitude in thousands of feet relative to sea level. In this regard, cabin pressure is related, but not linearly, to aircraft altitude as a consequence of cabin pressurisation that is applied in accordance with a pressurisation schedule until a maximum difference in pressure is established between the cabin and the external atmosphere.

The uppermost curve shown by solid line 1 on the graph of FIG. 1 represents the maximum permissible oxygen content for the breathable gas at various cabin altitudes. For the reasons that have been discussed the permissible maximum from sea level up to a cabin altitude of 15,000 feet (4500 meters) is 60%: thereafter the permissible oxygen concentration rises linearly with cabin altitude to a value of 80% at 20,000 feet (6100 meters). At cabin altitudes above this level there is no maximum limit for oxygen content in the breathable gas.

The lowermost curve shown by solid line 2 in the graph of FIG. 1 represents the minimum oxygen content for the breathable gas as determined by physiological and other requirements as above discussed. It will be noted that this curve has four distinct sections, a lower section covering the cabin altitude range from sea level up to 15,000 feet (4500 meters) where the curve is essentially a plot of constant oxygen partial pressure at sea level equivalent. The section of curve 2 between cabin altitudes of 15,000 feet (4500 meters) and 20,000 feet (6100 meters) rises linearly and more steeply than a plot of constant oxygen partial pressure, the reason for the enhanced oxygen content requirement over this range of cabin altitude being, as discussed, the need to provide for the effects of rapid depressurisation. In the cabin altitude range 20,000–23,000 feet (6100 to 7000 meters), the minimum required oxygen content remains constant at about 55%, whereafter the minimum required content rises with cabin altitude as a continuation of the sea level equivalent partial pressure curve because at the cabin altitudes concerned the sea level partial pressure provides the minimum oxygen content to meet the rapid depressurisation requirement.

The curve represented by the chain dotted line 3 in FIG. 1 is a plot of constant oxygen partial pressure at a value corresponding to that of the minimum required in the breathable gas at a cabin altitude of 20,000 feet (6100 meters): that is, the curve 3 touches the curve 2 at a cabin altitude of 20,000 feet (6100 meters) but is otherwise substantially above the curve 2, especially at lower altitudes: for instance at sea level the curve 3 shows the gas composition that it represents to have oxygen concentration of 30% as compared with the approximately 21% oxygen content of air at sea level.

The curve 3 thus represents the best performance of an OBOGS controlled so as to produce breathable gas of constant oxygen partial pressure throughout the operating range of cabin altitude and that just meets the minimum oxygen content requirement at a cabin altitude of 20,000 feet (6100 meters).

The curve represented by the broken line 4 in FIG. 1 illustrates the performance of an OBOGS in accordance with the invention and that, for simplicity, has been programmed to maintain a linear relationship between oxygen concentration and cabin altitude in each of the four sections of the curve. It will be noted that in the lower altitude ranges, curve 4 is significantly below curve 3, whereas in the critical cabin altitude range between 15,000 feet (4500 meters) and 20,000 feet (6100 meters) it rises more steeply than curve 2 to provide an enhanced safety margin to meet the rapid depressurisation case. At altitudes above 22,000 feet (6700 meters) the curve 4 is again closer to the curve 2 than the constant partial pressure curve 3.

It should be stressed that curve 4 is merely illustrative of possible performance of an OBOGS embodying the invention. In practice, because at every cabin altitude within the operating range, the oxygen content of the product gas is controllable to a specific value, the plot of product gas oxygen content against cabin altitude may be made to conform to any desired curve. For instance, the OBOGS may be made to deliver breathable gas having an oxygen concentration that at any particular cabin altitude within the operating range has a chosen excess, say 5%, over the minimum permissible at that altitude.

Figure 2:
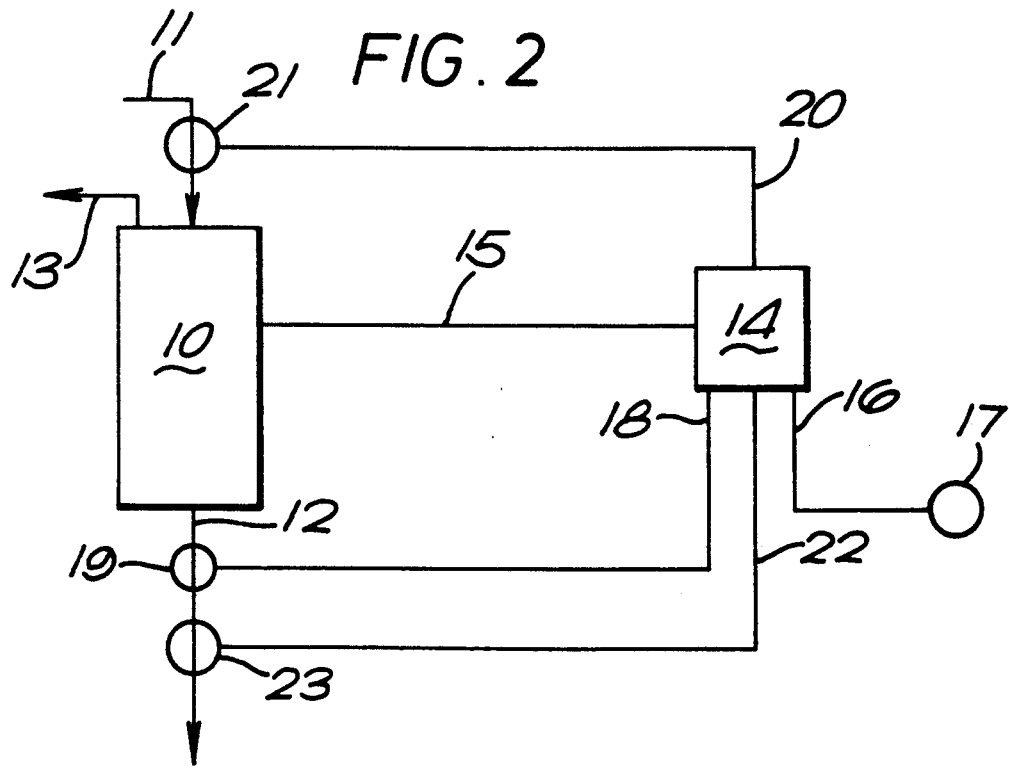
FIG. 2 is a block diagram of an on-board oxygen generating system (OBOGS) embodying the invention.

FIG. 2 illustrates in block diagram form the basic organisation of an OBOGS embodying the invention. In this Figure, block 10 represents a molecular sieve type gas separation system having a feed air supply at 11, a product gas outlet at 12 and a vent flow outlet at 13. The OBOGS further comprises control means represented by the block 14 that has a control connection 15, that may include electrical and/or pneumatic control links, to the gas separation system 10. The control means 14 is organised to cause separator sieve beds of the system 10 cyclically to undergo charge/adsorption on-stream and purge/desorption and regeneration phases, respectively, in a suitable overlapping sequence as is well understood in the art. Preferably the purge flow outlet 13 of the system 10 is connected to discharge to the atmosphere external to the aircraft so that desorption occurs at the lowest available pressure, but if desired the outlet 13 may be connected to discharge to the aircraft cabin since the pressure of this is related to the external atmosphere by the pressurisation schedule.

In accordance with the invention the control means 14 is connected to receive cabin pressure-representative signals at an input 16. These signals may be derived from a device 17 that directly measures cabin pressure or such signals may be derived from an aircraft altitude signalling device and be transformed into the required cabin pressure representative signals.

Also in accordance with the invention the control means 14 has an input 18 connected to receive a signal significant of the oxygen content of the product gas at outlet 12. For this purpose outlet 12 is provided with a suitable product gas oxygen content sensor 19.

Control means 14 stores information as to the desired product gas oxygen content at various levels of cabin pressure within an operating range. By utilising cabin pressure signals at input 16, the control means may therefore display the desired product gas oxygen content at a contemporary cabin pressure.

The control means 14 includes comparator means for comparing the displayed desired product gas oxygen content with the sensed product gas oxygen content as signalled at input 18. The comparator means are adapted to adjust the operating cycle time in a manner to make the system 10 deliver a product gas richer or poorer in oxygen as required to null the difference between the displayed and sensed oxygen content values.

In a typical embodiment with a molecular sieve gas separation system having three sieve beds organised as will be described below the control means 14 may be arranged to provide a cycle time selectable in steps of one second ranging from a minimum of nine seconds to a maximum of thirty seconds.

It is known characteristic of molecular sieve gas separation systems that their average product gas composition varies with the rate of flow. Thus in an OBOGS organised as illustrated in FIG. 2, increasing demand flow on the system 10 tends to reduce the oxygen content of the product gas, and conversely. However because the control means 14 are involved in a control loop that includes the oxygen content of the product gas, the control means can compensate for changes in demand flow.

In practical embodiments it is necessary to provide for warning of overload and malfunction conditions and in appropriate circumstances to provide for automatic switching to standby, emergency, oxygen supplies. For this purpose, information relating to maximum and minimum permissible product gas oxygen contents at various cabin altitudes may be stored in the control means 14 and these values compared continually with the sensed value of product gas oxygen content by means arranged to cause a warning and/or switch-over to standby oxygen to occur as appropriate to circumstances revealed by such comparison. However, to avoid false warning and to enable the control means 14 may have an input 20 connected to receive signals significant of feed air pressure at inlet 11, provided by a sensor 21, and an input 22 connected to receive demand flow signals from a sensor 23 at outlet 12. The control means may also include provision for other facilities such as testing and self-diagnostic routines.

Figure 3:
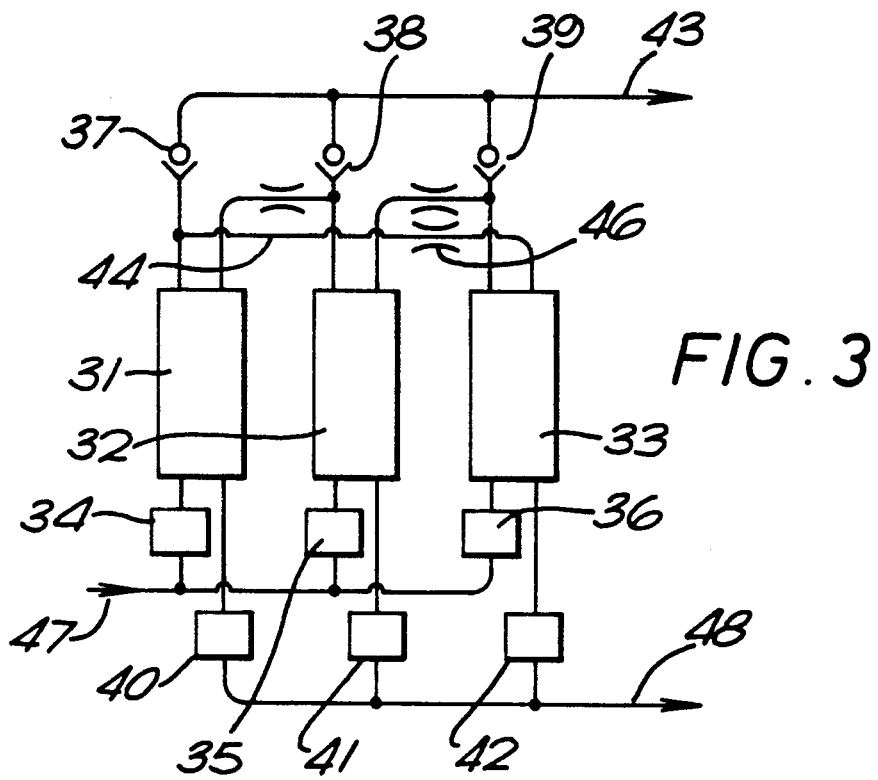
FIG. 3 is a schematic showing of a molecular sieve-type gas separation system that may be utilised in the OBOGS of FIG. 2.

FIG. 3 is a schematic showing of a convenient form of molecular sieve-type gas separation system that may constitute the system 10 in an OBOGS organised as described with reference to FIG. 2. This molecular sieve system is of the constructions described in detail in EP-A-0 129 304 and comprises three molecular sieve beds 31, 32 and 33, having individual inlet valves 34, 35 and 36 respectively; individual product gas outlet valves 37, 38 and 39 respectively; and individual vent valves 40, 41 and 42 respectively. The product gas outlet valves 37, 38, 39 are simple check valves having their downsteam outlets connected to a product outlet line 43 that corresponds with the outlet 12 in FIG. 2 and upstream of each product gas outlet valve there is a purge flow connection to the preceding bed in the operating sequence. That is to say, the product gas outlet of bed 31, upstream of the valve 37, has a purge connection 44 to a purge flow inlet 45 of bed 33; the product gas outlet of bed 32 has a corresponding connection to a purge flow inlet of bed 31; and the product gas outlet of bed 33 has a connection to a purge flow inlet of bed 32. These purge flow connections contain restrictors such as shown at 46 to limit purge gas flow.

The inlet valves 34, 35, 36 are connected to a common feed air supply 47 corresponding with the feed 11 of FIG. 2, while the vent valves 40, 41, 42 have a common exhaust connection to a vent line 48 corresponding with the purge flow outlet 13 of FIG. 2.

Figure 4:
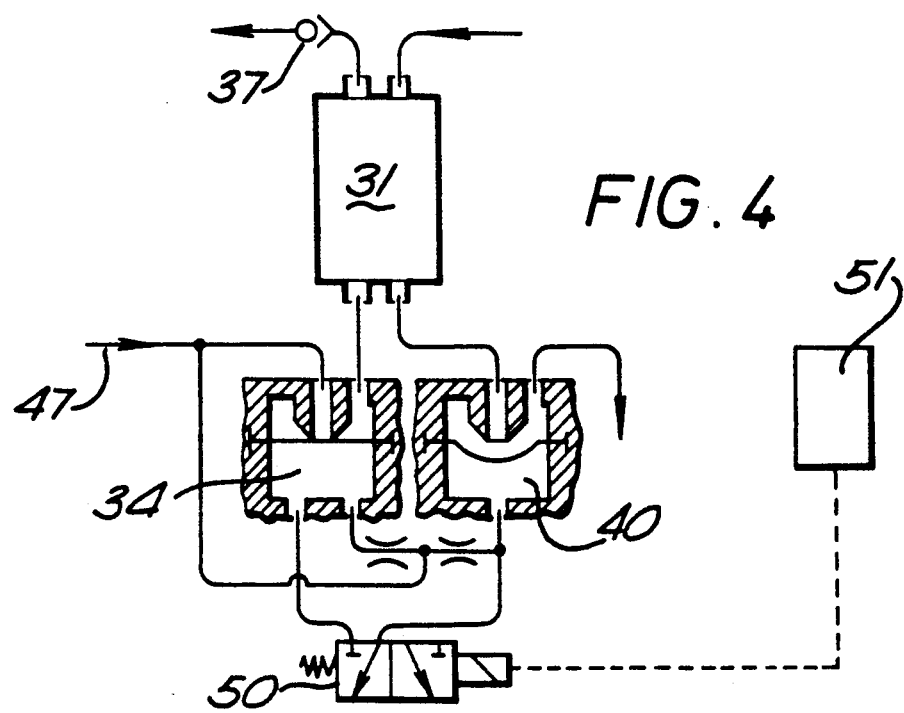
FIG. 4 is a schematic showing of the valve control arrangement for one bed of the system of FIG. 3.

The sieve beds 31, 32, 33 are conveniently arranged concentrically in a common housing as disclosed in EP-A-0 225 736, the various valves comprising diaphragm valves that in the case of the inlet valves and vent valves are pneumatically servo-operated by supply air pressure controlled by solenoid valves. FIG. 4 illustrates schematically the arrangement of the inlet and vent valves for one bed, such as bed 31, the solenoid valve controlling the inlet valve 34 and the vent valve 40 associated with that bed being shown symbolically at 50 and controlled by a timer 51 that would be part of the control means 14 in the OBOGS of FIG. 2. FIG. 4 shows the solenoid valve in its unenergised condition in which the inlet valve 34 is held closed by servo-pressure, while the vent valve 40 is permitted to open.

Energising the solenoid valve 50 releases the servo-pressure holding the inlet valve 34 closed, so that this may open, whereas servo-pressure is caused to build up in the vent valve 40 to close this. For a more detailed description of the sequential operation of the solenoid valve associated with the inlet and vent valves of the respective sieve beds, reference should be made to EP-A-0 129 304.

The OBOGS generally described with reference to FIG. 2 requires a product gas oxygen content signalling device at the outlet 12 of the gas separation system 10. The requirement here is for a device that provides a signal, analogue or digital, significant of either the oxygen partial pressure or the oxygen concentration of the product gas. A galvanic-type partial pressure sensor may be employed but it is preferred to employ a zirconia cell-type oxygen concentration sensor because such a device can have a suitably rapid response to provide the control means 14 with a desirably rapid response to changes in operating conditions.

Figure 5:
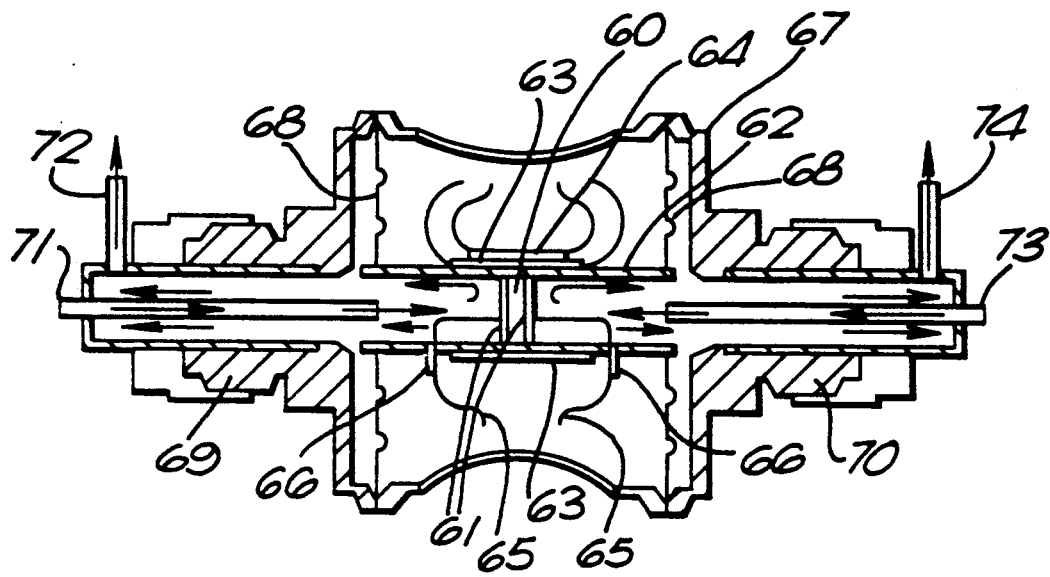
FIG. 5 illustrates, schematically, a zirconia cell oxygen concentration sensor that may be used in the control system of the OBOGS of FIG. 2.
Figure 6:
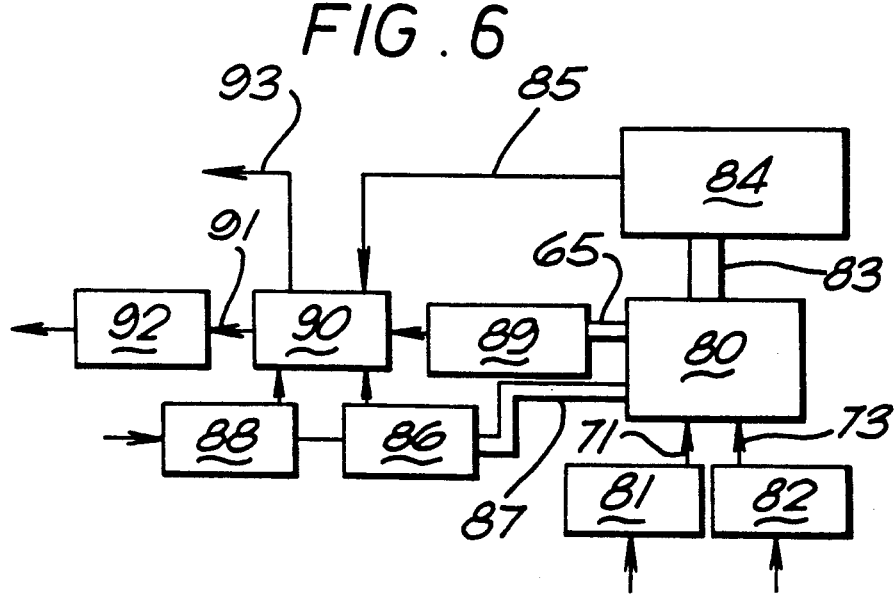
FIG. 6 is a block diagram of the control arrangements for the sensor of FIG. 5.

FIGS. 5 and 6 illustrate the construction and organisation of a suitable zirconia cell sensor.

As is well known, zirconia cell oxygen concentration sensors are solid state devices relying on the electrical properties of zirconia doped with yttria, at temperatures in excess of about 600° C. If a wafer of such doped zirconia is exposed to differing oxygen concentrations on its opposite sides, a small potential difference will be generated across it.

FIG. 5 shows the construction of a typical zirconia cell sensor. A zirconia disk 60 with porous platinum electrodes 61 on its opposite faces is mounted in a ceramic tube 62 having a heating element 63 wound thereabout together with an associated thermo-couple 64 for temperature control purposes. Leads 65 from the electrodes 61 are brought out of the tube 62 through suitable ceramic/glass seals 66 and the tube 62 is suspended within a stainless steel housing 67 by means of flexible diaphragms 68.

The housing 67 includes end fittings 69, 79 providing for the flow of sample and reference gases, respectively, to the opposite sides of the zirconia disk 60. Sample gas, in this case the product gas of the molecular sieve gas separation system, is led into the end fitting 69 at a suitably controlled rate, through an inlet tube 71 coaxial with and projecting into one end of the ceramic tube 62 so that the sample gas impinges on the centre of the zirconia disk, flows radially outwardly thereover and then reverses to flow in the annulus between the inlet tube 71 and the end fitting 69 to an outlet 72.

Similarly reference gas, in this case a bleed of the air supplied to the separation system, enters the end fitting 70 through an inlet tube 73 to impinge on the opposite side of the zirconia disk, flow thereover and return to an outlet 74.

Because the output of a zirconia cell sensor is low and bears a logarithmic relation to the oxygen content difference between the sample and reference gases, and the zirconia disk has to be brought to and then maintained acurately at a selected working temperature, a management system is required to control the sensor and to provide an easily usable output. FIG. 6 illustrates the organisation of such a management system. In this Figure the sensor cell is shown at 80 with associated sample and reference gas flow controllers 81, 82 supplying the respective gases to the inlet tubes 71 and 73 of the cell. Connections from the thermo-couple 64 are shown at 83 leading to circuitry represented by block 84 that provides a digital temperature signal output at 85.

The management system of FIG. 6 further comprises a heater drive unit 86 having connections 87 to the heater of the zirconia cell and receiving power from an electrical power supply unit 88.

The system further includes an analogue to digital converter 89 that receives the electrical output of the zirconia cell, over leads 65.

The management system further comprises a microprocessor 90 that receives the output signals from the converter 89; thermo-couple derived temperature signals output at 85; and signals from the heater drive 86 and the supply power unit 88. The microprocessor outputs control signals to the heater drive 86 to control warming up of the zirconia cell so as to minimise thermal fatigue of the ceramic materials, and to maintain the cell at a prescribed operating temperature over a specified range of ambient conditions, in conjunction with the temperature information from the thermocouple. The heater drive 86 conveniently operates in a pulse width modulation mode to regulate power input to the cell heater, the microprocessor controlling the pulse width.

The microprocessor 90 also linearises the cell output as provided by the converter 89 and compensates for any voltage offsets. The processor provides a product gas oxygen concentration value output at 91 that may go directly to the control means of the OBOGS or that may be subjected, as shown, to transformation, e.g. to a frequency modulated signal, by a signal processor 92.

The microprocessor 90 is adapted to monitor performance of the system that it manages and to provide a continual status output at 93.

It should be understood that the microprocessor 90 and possibly some of the electronic processing devices associated therewith could all be embodied in the control means 14 of an OBOGS arranged as in FIG. 2. That is to say, the system management function of the microprocessor and its associated devices might be provided by a computer providing also the control means for the OBOGS.

What is claimed is:

1. An on-board oxygen generating system for an aircraft, comprising a molecular sieve-type gas separation system arranged to deliver oxygen-enriched air as product gas to an outlet by adsorbing nitrogen from air fed to the system, the system including at least two sieve beds and control means for cyclically subjecting each said sieve bed to a charge/adsorption on-stream phase followed by a purge/desorption regeneration phase, the control means providing for a range of selectable cycle times and including means sensitive to the oxygen content of the product gas, means responsive to aircraft altitude to display a desired oxygen content of said product gas at an altitude within an operating range, and comparator means for comparing the displayed desired oxygen content with the sensed oxygen content of the product gas and adapted to adjust the cycle time in the sense required to null the difference between said displayed and sensed oxygen contents of the product gas.

2. A system according to claim 1, wherein the control means further includes a microprocessor having an associated memory, a look-up table of desired product gas oxygen contents at various altitude levels within an operating range stored in the microprocessor memory, and altitude sensing means connected for outputting altitude signals to the microprocessor, whereby the desired product gas oxygen content appropriate to the operating altitude is displayed by reference to the look-up table.

3. A system according to claim 2, wherein the microprocessor is programmed to output signals for control of the sequential operation of charge and vent valves of the sieve beds with a series of selectable overall cycle times ranging between a minimum and a maximum in a number of discrete steps.

4. A system according to claim 2, wherein the microprocessor outputs signals to an aircraft on-board computer for further control of charge and vent valves of the sieve beds.

5. A system according to claim 1, wherein the means sensitive to the oxygen content of the product gas comprises a solid electrolyte oxygen concentration sensor.

6. A system according to claim 5, wherein the oxygen concentration sensor is of zirconia-cell type.

7. A system according to claim 6, wherein the zirconia cell is controlled by a management system comprising a heater drive unit connected to a heater of the zirconia cell and connected for receiving power from an electrical power supply unit.

8. A system according to claim 7, wherein the management system further comprises an analogue to digital converter connected for receiving an electrical output of the zirconia cell.

9. A system according to claim 8, wherein the management system further comprises a microprocessor that receives output signals from the converter, heater temperature signals, heater drive unit signals, and power supply unit signals, and outputs control signals to the heater drive unit.

10. A system according to claim 1, wherein the control means provide means for discriminating between ground and flight conditions and warnings of malfunction and/or overload of the system.

11. A system according to claim 1, wherein the control means include means for receiving and deriving rate information in relation to altitude or other operating parameters and on the basis thereof superimpose an adjustment on the cycle time to anticipate the magnitude of a required change in desired product gas oxygen content.

12. A system according to claim 1, wherein the control means include means for switching between selectable operating modes appropriate to a mission being flown or to be flown by an aircraft in which the system is fitted, and/or to provide for ready adaptation of the system to the requirements of an aircraft in which it is to be fitted.

* * * * *